(12) United States Patent
Raman et al.

(10) Patent No.: US 7,170,517 B2
(45) Date of Patent: Jan. 30, 2007

(54) CURVED-SLAB MAXIMUM INTENSITY PROJECTIONS

(75) Inventors: Raghav Raman, San Jose, CA (US); Sandy A. Napel, Menlo Park, CA (US); Geoffrey D. Rubin, Woodside, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 187 days.

(21) Appl. No.: 10/723,166

(22) Filed: Nov. 26, 2003

(65) Prior Publication Data

US 2004/0228518 A1 Nov. 18, 2004

Related U.S. Application Data

(60) Provisional application No. 60/429,590, filed on Nov. 27, 2002.

(51) Int. Cl.
*G06T 17/00* (2006.01)
(52) U.S. Cl. ............... 345/424; 382/128; 345/419
(58) Field of Classification Search ............... 382/134, 382/154
See application file for complete search history.

(56) References Cited

U.S. PATENT DOCUMENTS

| | | | |
|---|---|---|---|
| 5,570,404 | A | 10/1996 | Liang et al. |
| 6,445,762 | B1 | 9/2002 | Knoplioch et al. |
| 6,643,533 | B2 | 11/2003 | Knoplioch et al. |
| 6,674,894 | B1 * | 1/2004 | Parker et al. ............... 382/154 |
| 2003/0056799 | A1 * | 3/2003 | Young et al. ............... 128/922 |
| 2003/0163036 | A1 | 8/2003 | Prince |
| 2003/0166999 | A1 | 9/2003 | Liu et al. |

OTHER PUBLICATIONS

Frangi et al., Model-Based Quantitation of 3-D Magnetic Resonance Angiographic Images, Oct. 1999, IEEE Transactions on Medical Imaging, vol. 18 No. 10, pp. 946-956.*
Paik et al. (1998) in a paper entitled "Automated flight path planning forvirtual endoscopy" and published in Med. Phys. 25:629-637.
Napel et al (1992) "CT angiography with spiral CT and maximum intensity projection", published in Radiology 185:607-610.

* cited by examiner

*Primary Examiner*—Ulka Chauhan
*Assistant Examiner*—Said Broome
(74) *Attorney, Agent, or Firm*—Lumen Intellectual Property Services, Inc.

(57) ABSTRACT

A method to define a curved slab region of interest that includes vessels while maximally excluding surrounding soft tissue and bone is provided. The thickness of the curved slab is automatically adapted to the thickness of the vessel and follows the tortuous vessel(s) so that an increase in tortuousity does not result in a disproportionate increase in the region of interest required to enclose the vessel. A plurality of boundary pairs is determined in the view plane to define a vessel. Vessel-intensities are determined for each one of the boundary pairs. The boundary pairs with associated intensities define the view of the vessel in the projection plane. Context-intensity could be defined in the area surrounding the boundary pairs in the projection and/or transverse plane. The method also includes several steps that will result in a better boundary outline and view of the vessel.

17 Claims, 10 Drawing Sheets

710

720

720

CURVED-SLAB MAXIMUM INTENSITY PROJECTIONS

CROSS-REFERENCE TO RELATED APPLICATIONS

This application is cross-referenced to and claims priority from U.S. Provisional Application 60/429,590 filed Nov. 27, 2002, which is hereby incorporated by reference.

STATEMENT REGARDING FEDERALLY SPONSORED RESEARCH OR DEVELOPMENT

The present invention was supported in part by grant number 5RO1HL58915 from the National Institutes of Health (NIH). The U.S. Government has certain rights in the invention.

FIELD OF THE INVENTION

The present invention relates generally to medical imaging. More particularly, the present invention relates to visualization of blood vessels.

BACKGROUND

The maximum intensity projection (MIP) method is commonly used as a three-dimensional postprocessing method to depict volumetric vascular data sets acquired with both computed tomography (CT) and magnetic resonance (MR) imaging. Both modalities tend to produce a large number of primary reconstructed sections, which has prompted a greater use of three-dimensional postprocessing. In addition, three-dimensional vascular anatomy is difficult to discern when only cross-sectional images are used. MIPs are capable of presenting angiogram-like views calculated from the primary data that make anatomic and pathologic features easier to identify. To produce MIPs, a viewing angle is chosen to define the projection plane. Parallel rays are then cast from the projection plane through the stack of reconstructed sections that make up the data volume, and the maximum intensity encountered along each ray is placed into the projection plane to construct the MIP. Vessels have higher contrast intensity values than those for soft tissue. Therefore, the MIP shows a projected two-dimensional view of the vessels as seen from the center of the projection plane. Since some information is lost in the conversion from three to two dimensions, MIPs can be computed from many viewing angles and shown in a cine loop to convey the three-dimensional anatomy of the vessels.

The contrast in MIPs decreases with increasing projected volume (MIP thickness) because the probability that the maximum value encountered in the background will match or exceed the vessel intensity increases with MIP thickness. Although MIPs exhibit an increased contrast-to-noise ratio compared with that of source images, predominantly as a result of decreased noise, the reduced contrast between vessels and background can result in artifacts. This effect can lead to the disappearance of vascular features that have intensities only as great as the intensity of the background. Therefore, small vessels, which have decreased intensity as a result of volume averaging, can become invisible. The edges of larger vessels, which are less intense than the vessel center because of volume averaging, may be obscured, which leads to apparent vessel narrowing. High-grade stenoses may be overestimated on MIPs and appear as segmental vessel occlusions.

Regions of interest (ROIs) can be defined around vessels to limit the MIP thickness, thereby improving contrast in the MIP. In CT angiography, this method also allows the exclusion of high-attenuating bone that otherwise could overlap and obscure the vessels. A rectangular oblique plane can be easily specified and thickened to enclose a cuboidal ROI that can be used to produce conventional rectangular-slab MIPs, which are also known as thin-slab MIPs. In regions of complex and tortuous anatomy and for certain viewing angles, however, cuboidal ROIs cannot maximally exclude bone (See e.g. Napel et al. (1992) in a paper entitled "*CT angiography with spiral CT and maximum intensity projection*" and published in Radiology 185:607–610) and may include excessive soft tissue. Usually, separate cuboidal ROIs have to be specified for each vessel of interest, which increases the number of MIP reconstructions per study. Alternatively, manual section-by-section editing can be performed to draw ROIs around structures to exclude or include them, but this is tedious, may not be reproducible, and may be susceptible to tracing errors (See e.g. Napel et al. (1992) in a paper entitled "*CT angiography with spiral CT and maximum intensity projection*" and published in Radiology 185:607–610). Accordingly, there is need for a new method that adaptively encloses vessels of interest while excluding bone and surrounding soft tissue.

SUMMARY OF THE INVENTION

The present invention provides a method to automatically define a curved slab ROI that preferably only includes vessels while maximally excluding surrounding soft tissue and bone. The thickness of the curved slab is automatically adapted to the thickness of the vessel. The curved slab ROI branches to include vessel branches while excluding the soft tissue between branches. The curved slab follows tortuous vessels so that an increase in tortuousity does not result in a disproportionate increase in the ROI required to enclose the vessel.

In one aspect a method for viewing a vessel in an image with a three-dimensional volume is described. Each image distinguishes a projection plane and a view plane, which is typically defined as perpendicular to the projection plane. A plurality of boundary pairs is determined in the view plane to define one or more vessel(s). Vessel-intensities are determined for each one of the boundary pairs. The boundary pairs with associated intensities define the view of the vessel. In some aspects, a context-intensity is defined in the area surrounding each one of the boundary pairs in the projection and/or transverse plane. The method includes several steps that will result in a better outline and view of the vessel(s). For instance, the boundary pair could be fine-tuned using the vessel intensities and background intensities. Using digital filtering one could also eliminate sudden or large changes in the outline of the boundary pairs.

In another aspect, the method determines areas of similar intensity to the vessel intensity located near or attached to the vessel boundary. These areas could for instance be calcium or bone. In case a calcium region is located then the method could decide to include this area from the determination of the boundary pair(s). However, in case a bone region is located then the method would like to exclude this area from the determination of the boundary pair(s). In regions of stenosis the boundary pairs might result in a zero or close to zero thickness. The method could then specify a minimum boundary pair for this region so that the tissue around the stenosis is included in the ultimate view. Boundary pairs could be estimated from neighboring boundary pairs to accommodate these regions of stenosis as well as other regions such as branching.

In a specific example, a method for viewing a structure of interest in an image with a three-dimensional volume is described. In a plane of the image a start-point and an end-point are selected that would encompass the structure of interest. The digital image plane includes a plurality of pixels. For each of these pixels a boundary pair and associated intensity is determined. This is accomplished by projecting a line for each pixel in the view direction of the plane. A boundary pair is determined that intersects the vessel along the line. At least one first (vessel) intensity value is determined for the vessel enclosed by the boundary pair. A second intensity is determined for the structures surrounded by the boundary pair along the line. Using the first and second intensity values, an adaptive threshold method is used to re-determine the boundary pair. Once the boundary pair is finalized a new first (vessel) intensity is determined. The re-determined boundary pair and associated vessel-intensity are assigned to the pixel. Repeating this for a plurality of pixels, at least the one enclosing the vessel, would result in a curved slab region of interest of the vessel.

In another aspect, a movie can be created to view one or more structures of interest by applying the present method for a plurality of projection planes. This would include defining a plurality of image projection planes and then determining for each one of the projection planes a plurality of boundary pairs that defines the structure of interest in the view plane associated with the projection plane. Intensity value(s) are determined for the structure of interest associated with each one of said boundary pairs. The view in each projection plane is defined by the plurality of boundary pairs and associated intensities. Sequencing through the plurality of projection planes with the defined views is perceived as a movie.

The advantage of the present invention is that the curved-slab MIP increases overall arterial contrast to background compared with rectangular-slab MIP as a result of reduced background intensity and exhibits a corresponding reduction in apparent vessel narrowing that may reduce overestimation of stenoses and disappearance of low-intensity vessels. The present method allows multiple vessels to be included in each image without including excessive amounts of soft tissue and high-attenuating bone. This method has the potential to reduce the time required to assess vasculature with MIPs.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The present invention is a post-processing method for volumetric vascular data sets acquired with CT imaging, MR imaging or any other related imaging technique. The present invention automatically defines a curved slab region of interest (ROI) that only includes one or more vessels while (maximally) excluding surrounding structures such as soft tissue and bone. The thickness of the curved slab is adapted to the thickness of the vessel or in more general terms to the thickness of one or more structures of interest. The curved slab follows tortuous vessel(s) so that an increase in tortuousity does not result in a disproportionate increase in ROI required to enclose the vessel(s).

Figure 1:
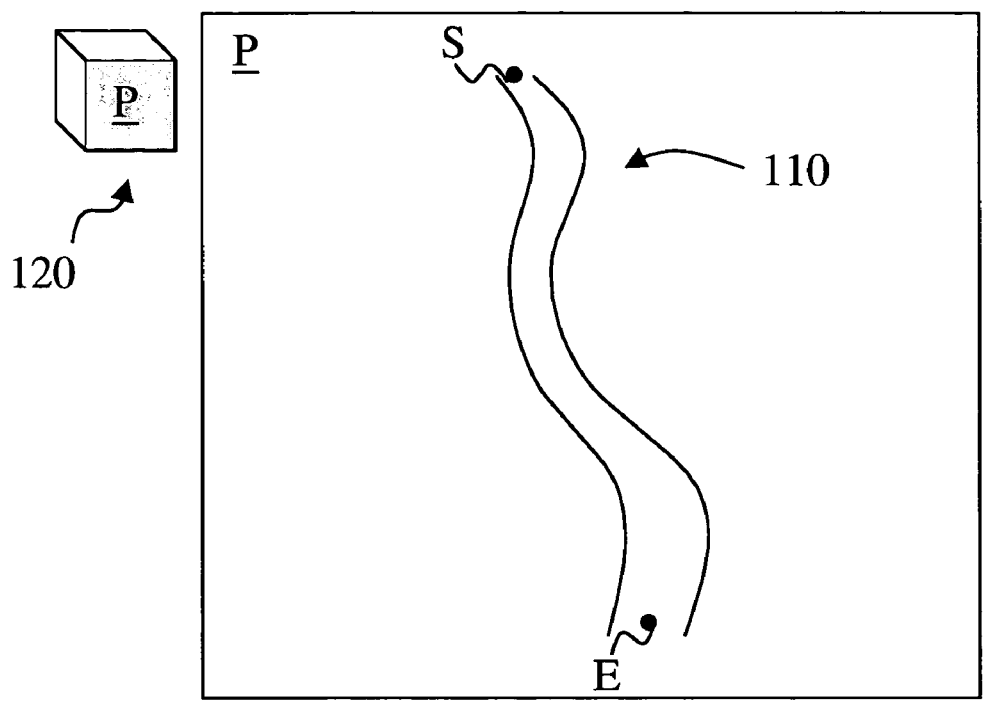
FIG. 1 shows an example of a projection plane selecting a start point and end point of a vessel according to the present invention.
Figure 1:
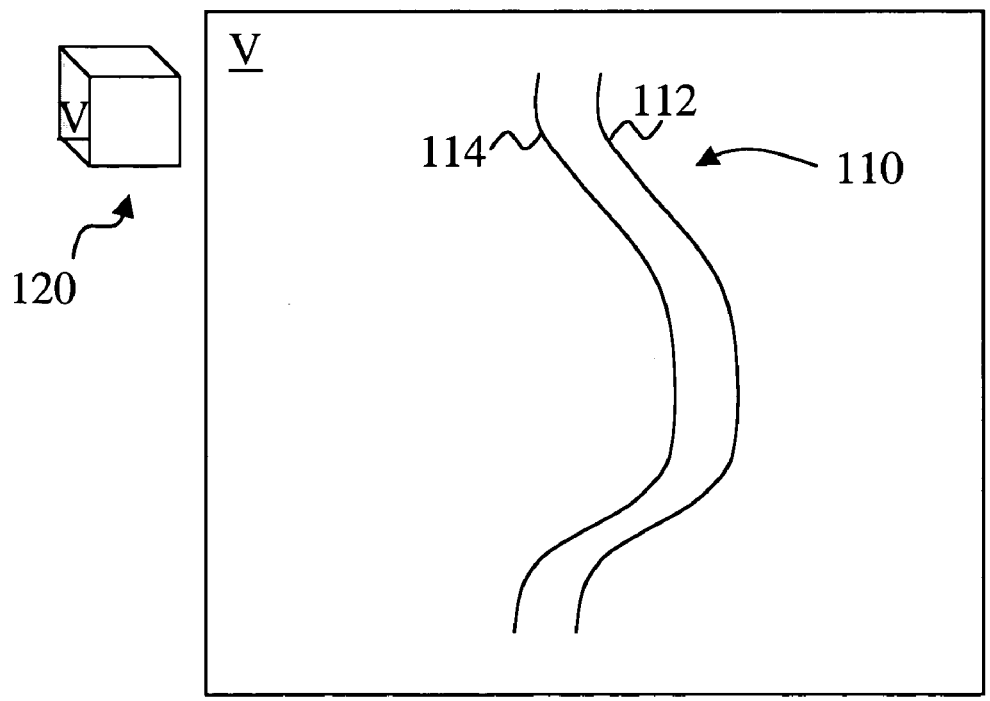

The method requires the identification of a start-point (S) and end-point (E) of a vessel 110 that is to be included in the curved slab MIP as shown in FIG. 1. These points can be selected in a transverse, a frontal, or a sagittal view. In general, these points can be selected in any projection (P) plane obtained from a volumetric data set 120. The selected start and end-points are not required to be exact, since they are only used as guides for further automated processing.

The method continuous in the view plane V associated with a projection plane P. In view plane V, the boundaries 112, 114 of vessel 110 can be recognized. Preferably, a view plane V is defined as the plane perpendicular to the projection plane P, however, the view plane could also be defined at angles other than 90 degrees from the projection plane. It is noted that the tortuousity of the vessel is generally not the same in the projection plane and view plane, i.e. a tortuous vessel 110 has a different tortuousity in the projection plane than in the view plane as shown in FIG. 1.

Figure 2:
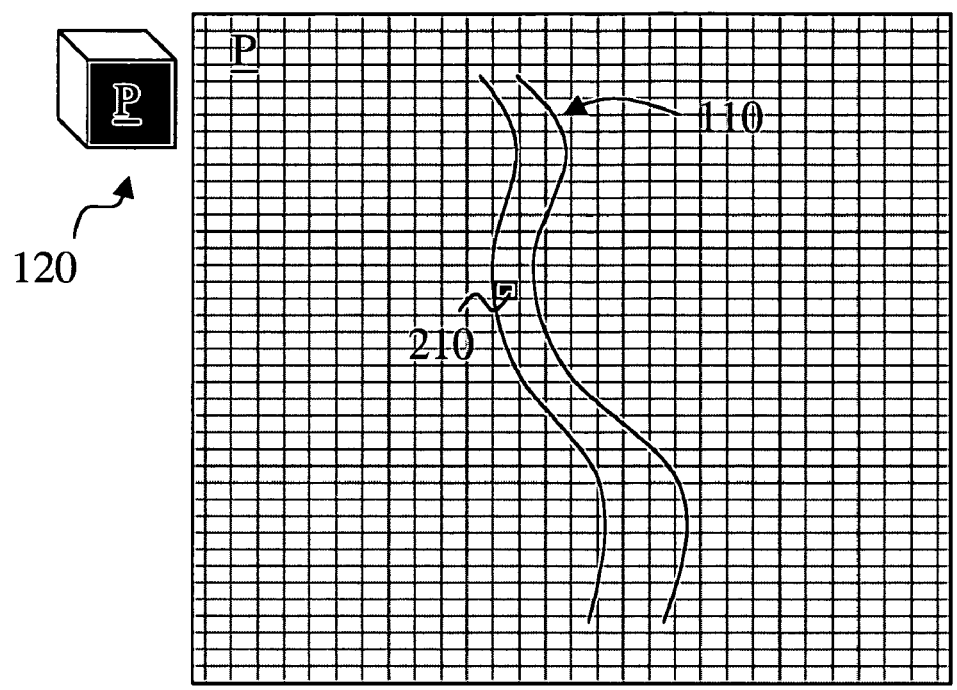
FIG. 2 shows an example of determining a boundary pair for a pixel according to the present invention.
Figure 2:
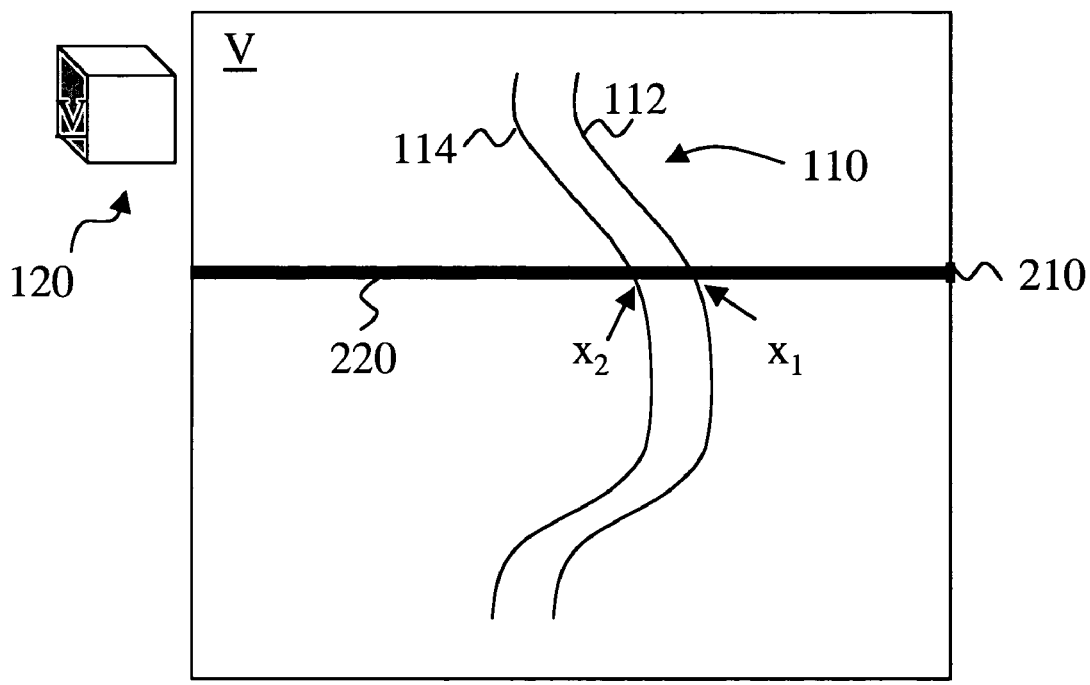
Figure 3:
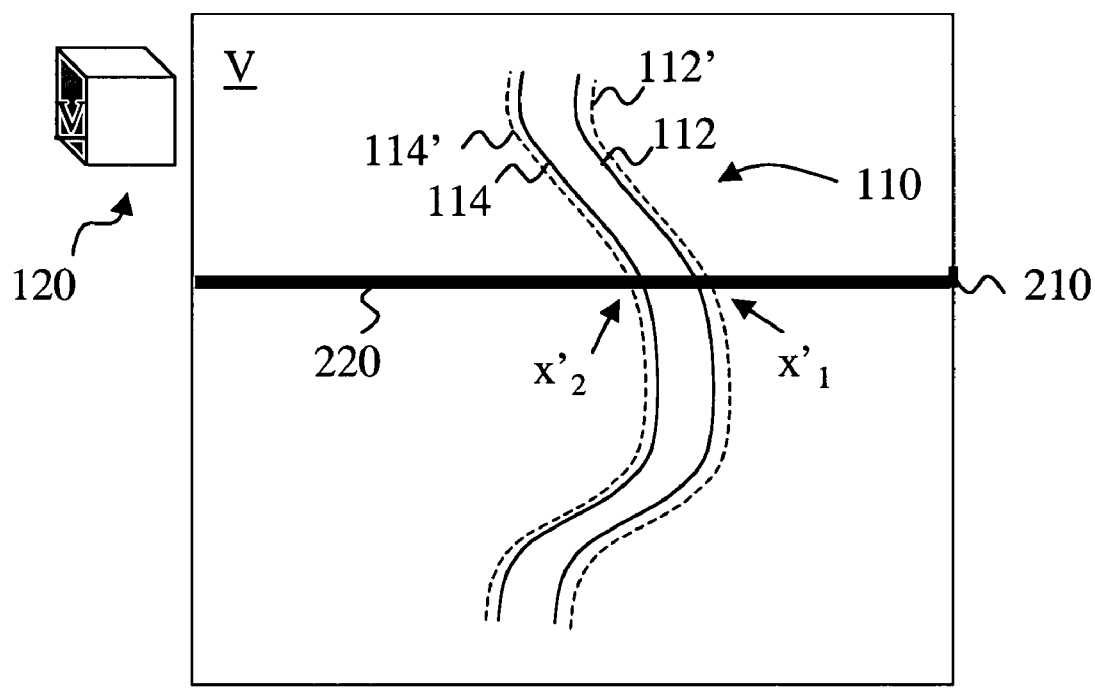
FIG. 3 shows an example of fine-tuning or re-determining a boundary pair according to the present invention.
Figure 4:
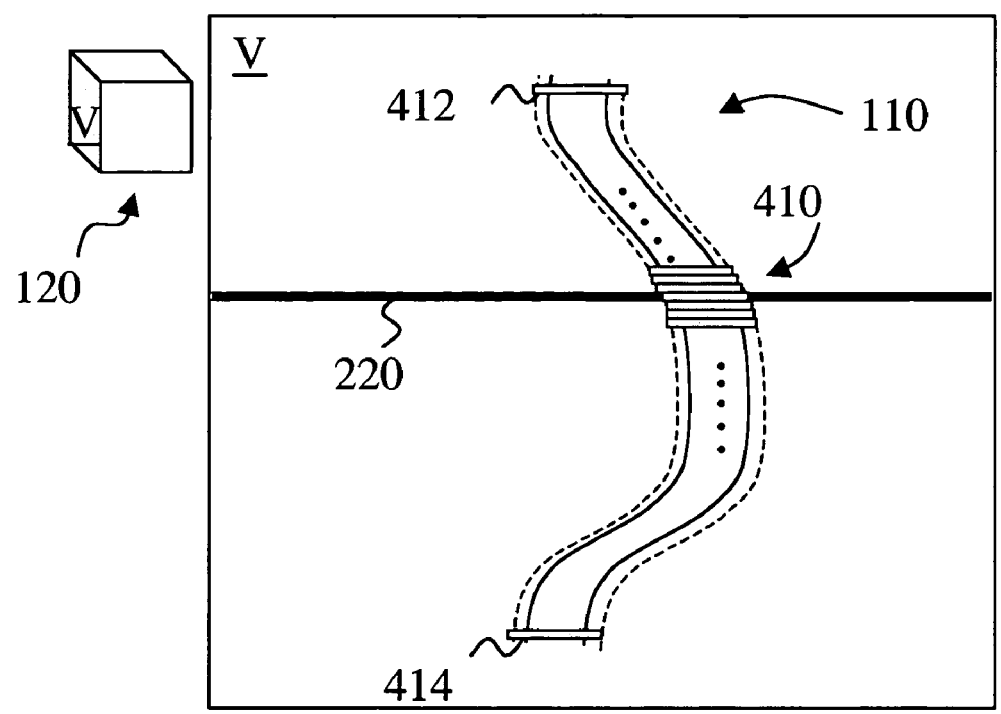
FIG. 4 shows an example of determining and smoothing a curved slab define for a vessel according to the present invention.
Figure 4:
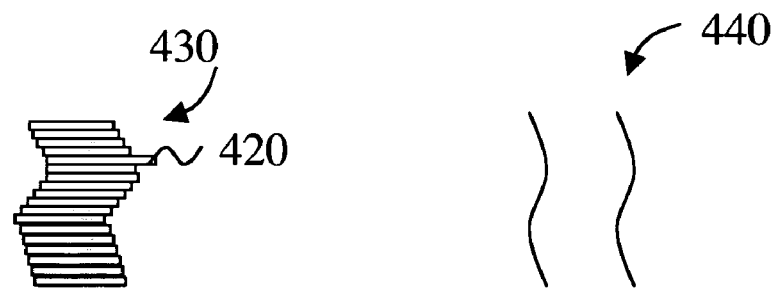
Figure 5:
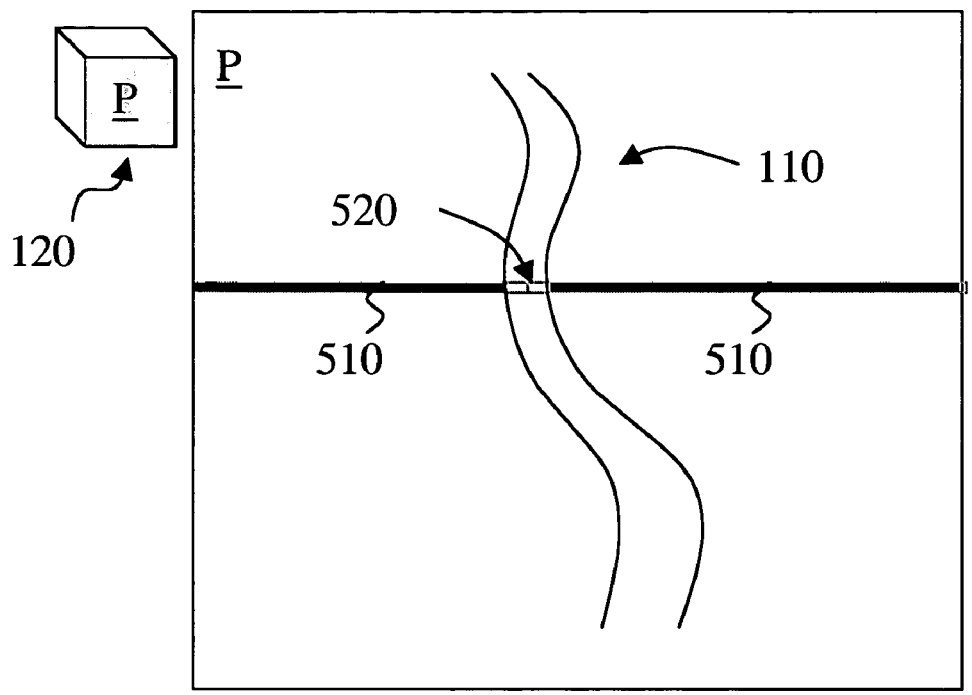
FIGS. 5–6 shows examples of context-intensity for a projection plane and a transverse plane according to the present invention.
Figure 5:
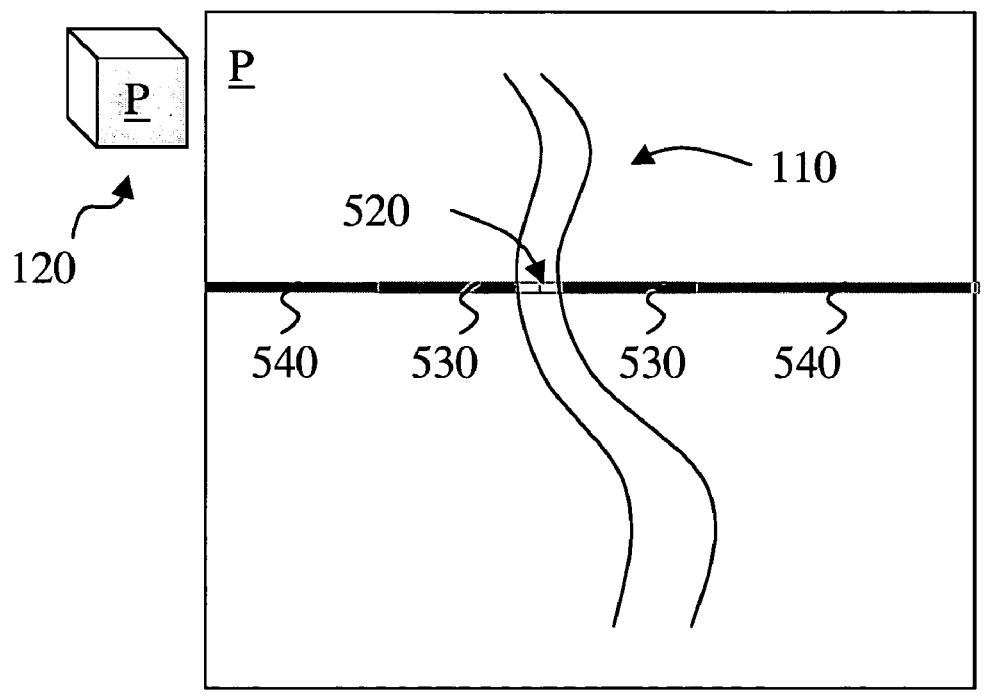

FIG. 2 shows a projection plane P with a plurality of points or pixels, such as pixel 210. For each pixel in projection plane P or at least each pixel in a group of pixels in projection plane P, a section or a line 220 is projected in the view plane V. The objective is to determine for each pixel a boundary pair that defines the vessel as well as the intensity value for that boundary pair. To find a boundary pair for pixel 210, points $x_1$ and $x_2$ are determined along line 220 that intersect with vessel 110. In general, the points are initially determined based on the contrast between the intensity of the vessel (i.e. a first intensity or vessel-intensity) and the intensity of the background voxels (i.e. a second intensity or context-intensity) encountered in the view plane along the line. The first intensity could be determined as the maximum intensity of the vessel (which is preferred), the intensity of the center-point of the vessel along the line, the mean intensity of the vessel or any other mathematically calculated intensity of the vessel. The second intensity could be determined as the average intensity of the background voxels along the line. The initially determined boundary point and therewith the intensity for a line and associated pixel could be fine-tuned using an adaptive threshold. The adaptive threshold is based on calculating the standard deviation value of the background intensity and the vessel intensity to determine a threshold value that re-determines the boundary pair. The values for the vessel intensity could vary, and are usually between 100 and 600 Hounsfield Units (HU). The values for the background intensity typically vary less than the vessel-intensity, and are usually between −100 HU and 200 HU. There is also a variation between patients and between different areas in each patient. Dependent on the local vessel intensity and background intensity, in one exemplary embodiment, the calculated threshold falls between 50 and 300 HU. The threshold is set proportionally closer to the value for the maximum vessel intensity if the standard deviation of vessel intensity values is smaller than the standard deviation of the background intensity values. If the contrary is true, then the threshold will be proportionally closer to the value for the background intensity values. This threshold is then used to fine-tune the anterior and posterior boundary points $x_1$ and $x_2$ as shown by 112' and 114' in FIG. 3 (also indicated by dashed lines). The difference between $x_1$ and $x_2$ is the boundary pair or the thickness of the slab for that line and pixel. The associated vessel intensity for the re-defined boundary pair is determined either by taking the maximum of the intensity values defined by the re-defined boundary pair, by taking the intensity of the new center point of the vessel along the line, by averaging intensity values defined by the re-defined boundary pair, or by using any other mathematical expression applied to the intensity values defined by the re-defined boundary pair. In practice, the added thickness resulting in the difference between $x_1'$, $x_2'$, and $x_1$, $x_2$ respectively is about 3 pixels or 1.5 mm. The final outcome is a boundary pair re-defining the thickness of the slab 220 and intensity value to give that thickness at the pixel level 210. FIG. 4 shows a plurality of calculated boundary pairs 410 defining vessel 110 from start-point (boundary pair 412) to end-point (boundary pair 414) each with their associated intensities (not shown). Note that not all boundary pairs are shown as indicated by the dotted lines. To eliminate artifacts and/or sudden or large changes 420 of the boundary pairs 430, the boundary points could be filtered using a digital filter which results in a smooth/filtered outline defined by the boundary pairs as shown by 440. Instead of digital filtering, one could also compare the mean and standard deviation of the measured variation in boundary pair values to the change at every point. For instance, if the change is more than e.g. 2.5 standard deviations from the mean change seen within 40 mm of the point, the boundary pair at that point is deleted and its value is estimated from adjacent acceptable boundary pairs.

In one aspect, one might want to include high intensity fragments around the vessel in the boundary pair determination since they have clinical value, e.g. calcium fragments. These fragments are detected around the vessel boundary by looking for connected pixels that have high intensity and small size. Conversely, large fragments that have high intensity are considered to be "bone" and should be excluded. A small size is, for instance, defined by an area less than 5 by 5 (100 pixels) or by a volume less than 5 by 5 by 5 (1000 pixels). Large is defined as an area greater than 5 by 5 (100 pixels) or a volume greater than 5 by 5 by 5 (1000 pixels). The thickness value(s) could then either be increased (decreased) to include (exclude) these small (large) fragments with high intensity when calculating the final region of interest; i.e. the boundary pairs and intensities are re-determined in case the method incorporates calcium and bone analysis to ensure that the high intensity areas that occur in the region of the vessel either do or do not affect the threshold selection depending on the clinical relevance.

Boundary pairs detected along lines that are at the region of a stenosis are most likely to be calculated as zero thickness. In one aspect, for these points, a thickness for the vessel is estimated based on the calculated thickness from one or more boundary pairs above and below the vessel at the stenosis. Including a thickness at a region of stenosis would be preferred since the image then includes the soft tissue that is causing the stenosis. In another aspect a minimum slab thickness of about 4 voxels could be enforced to ensure that areas of tight stenosis will be fully included in the curved slab.

In the view plane, the intensities are now defined for the boundary pairs, which together define the view of the vessel from start-point to end-point. The boundary pairs follow the (tortuous) vessel closely therewith minimizing the volume required to view the vessel. Structures surrounding the defined vessel that would otherwise obstruct or obscure the vessel are now excluded. In one aspect, the intensity for the surrounding structures could be set to a significantly different value 510 from the determined vessel-intensities 520, e.g. a black value, whereby only the defined vessel is visible with its calculated intensities. In other words, there would be one intensity value 510 assigned for those surrounding structures along a line.

Figure 6:
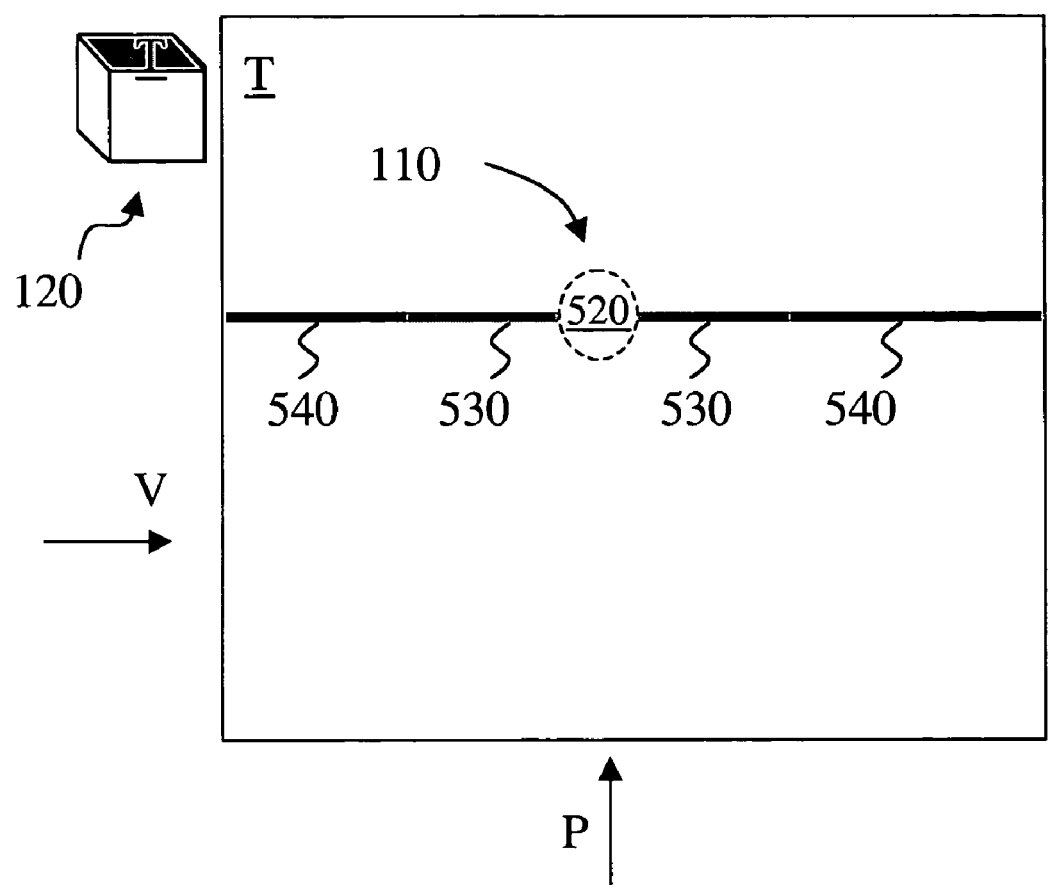

However, in practice it would be preferred to view the vessel in light of a context, i.e. its surrounding structures. Therefore, in another aspect, the structures surrounding the defined vessel could be assigned one or more context-intensity values 530, which are derived from the original values of the tissues surrounding the defined vessel. However, the boundary pairs for the context-intensity regions are estimated from the values for the boundary pairs of the vessel. For instance, one could set the values for the boundary pairs of the context intensity region to the $25^{th}$ percentile of the values for the boundary pairs measured for the defined vessel. This ensures that a minimal amount of context-intensity region is included for each vessel, but allows a larger context-intensity region for larger vessels. This context intensity region extends laterally for e.g. 5 mm or less, and the remainder area along the line could be set to e.g. a black intensity value 550. An analogous context-intensity could be applied in the transverse plane (T) as shown in FIG. 6. The length and width for the context-intensity area could be different for the projection and transverse plane. If there is an overlap between the selected area for the context-intensity and the vessel (e.g. in case of a vessel branch, multiple vessels, or the like) then smaller areas for the context-intensity could be determined or even avoided (See also FIG. 10).

Figure 7:
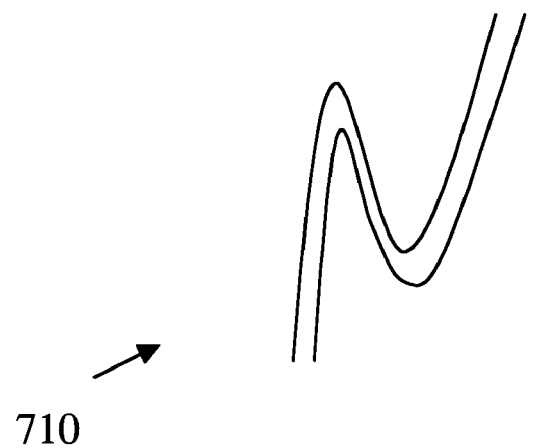
FIG. 7 shows examples of different vessels architectures.
Figure 7:
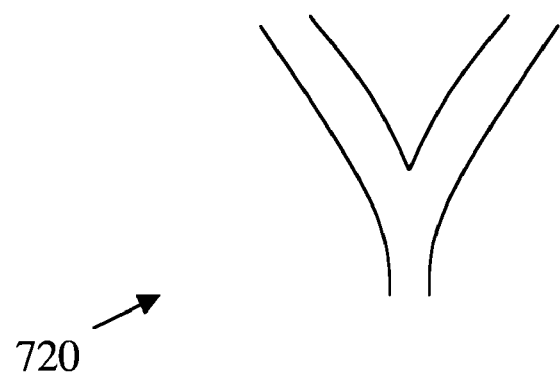
Figure 7:
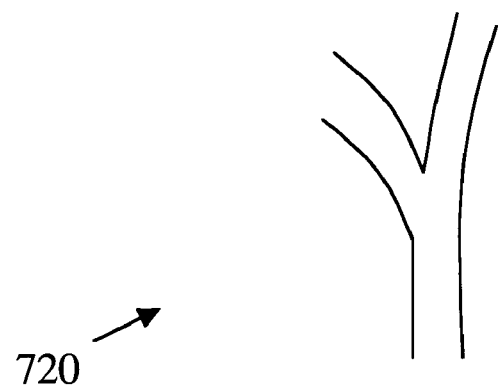
Figure 8:
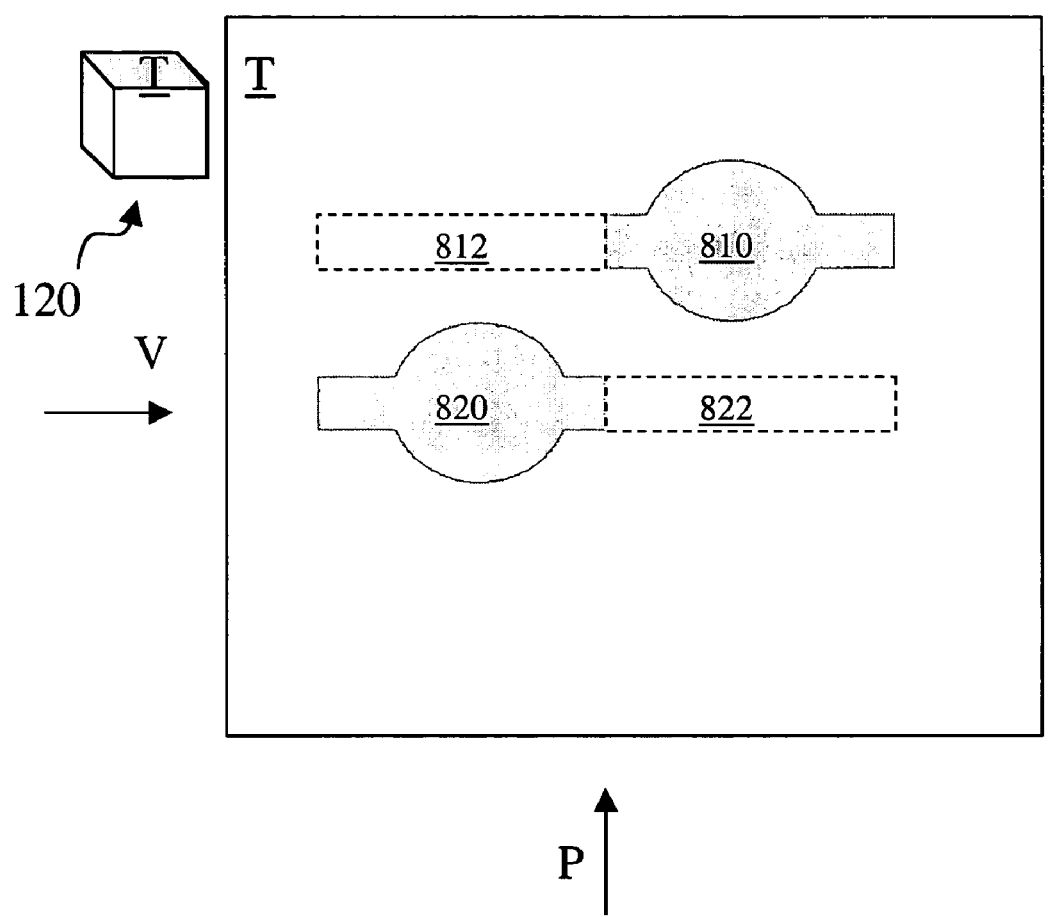
FIG. 8 shows an example of a context-intensity in case multiple vessels are viewed according to the present invention.

Vessels typically double back to themselves 710 or split into two or more branches 720, 730 as shown in FIG. 7. In case a vessel double backs to itself the method of the present invention could determine multiple intersections between each line and the vessel. One could then decide to include one or more boundary pairs to define the ROI for that line. In case of branches, the method would calculate a sudden increase in thickness. Preferably, at such branch points, the maximum thickness specified should not include the origin of the branch. This is accomplished again by detecting these areas of sudden increase in thickness and rejecting the thickness values either by filtering or threshold measurements. The thickness values are then estimated from the vessel above and below the branch point. Context-intensity could also be selected to ensure that multiple vessels or structures of interest are made visible. FIG. 8 shows a transverse view of two vessels 810, 820 for which part of the context-intensity 812, 822 is set such that it would not obstruct or obscure the view of the vessels from the projection plane in case both vessels are to be viewed simultaneously.

Figure 9:
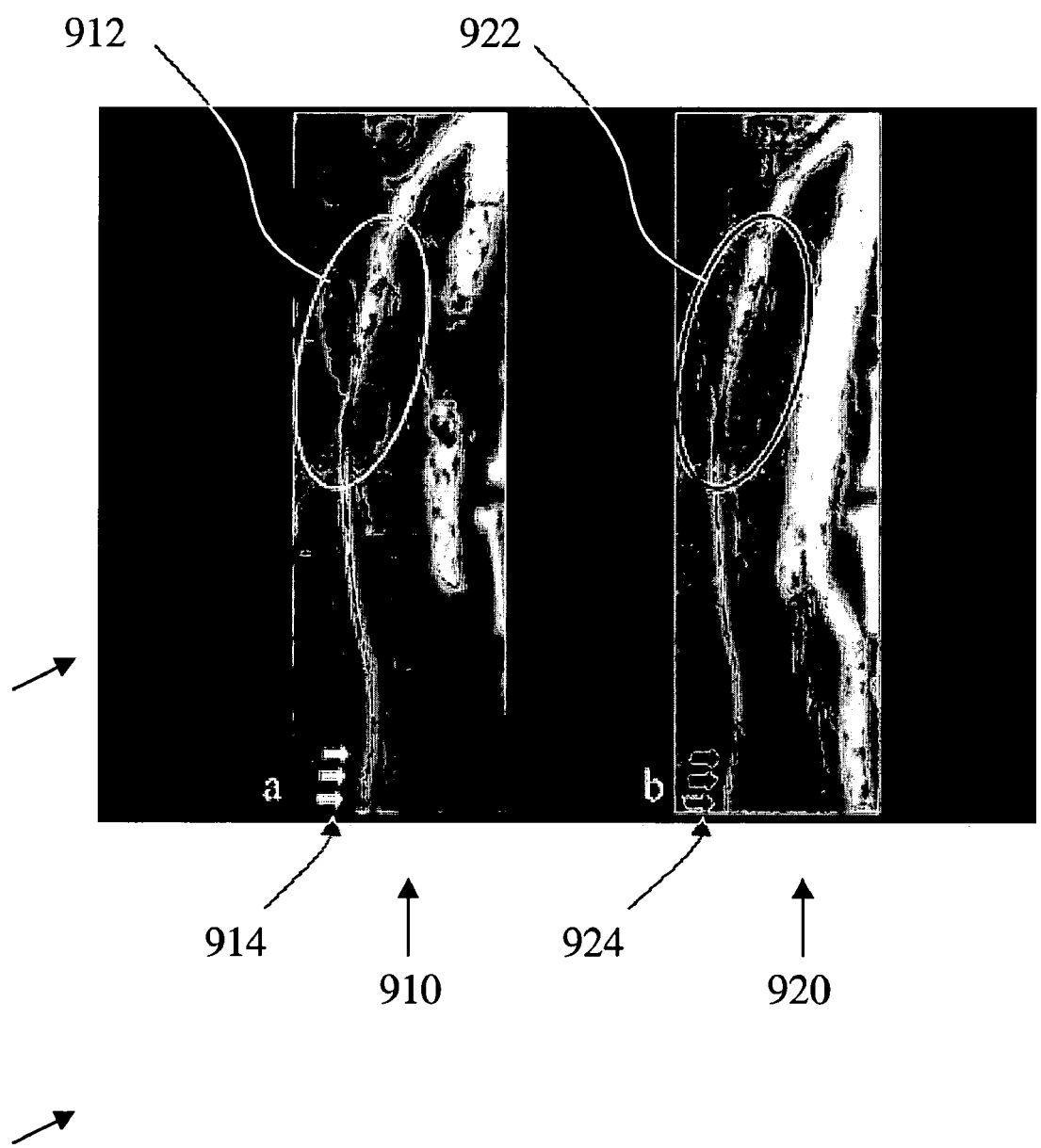
FIG. 9 shows an example of a comparison between a result of the curved slab method of this invention and a rectangular slab method.
Figure 10:
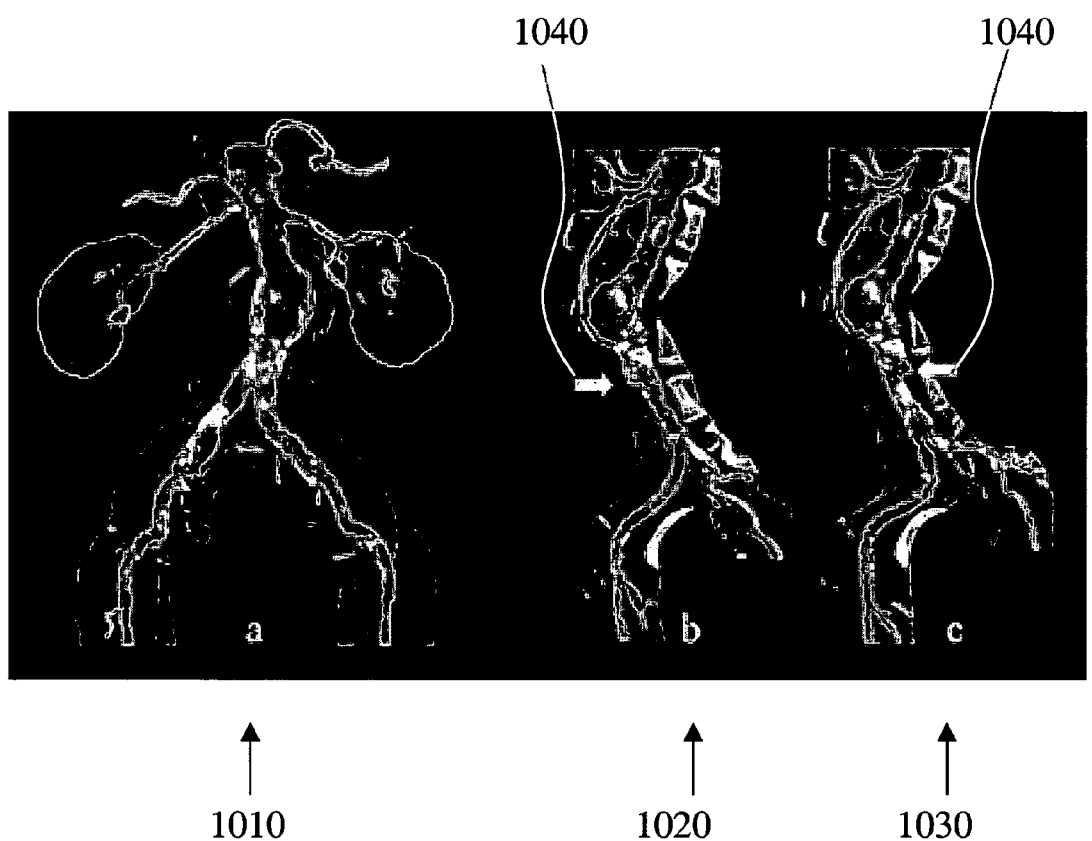
FIG. 10 shows examples of different views of vessels viewed by using the method of the present invention.

FIG. 9 shows an example 910 of a curved-slab MIP of the superior mesenteric artery obtained with the present method. This image is compared with an example 920 of a rectangular-slab MIP (i.e. a conventional method) through the same vessel. The comparison shows inclusion of high-intensity tissue (ellipse 922) and apparent narrowing of distal vessel (arrows 924) in the rectangular-slab MIP compared to the same region (ellipse 912, arrow 914 respectively) on the curved-slab MIP. FIG. 10 shows different views including different vessels depending on the view. A frontal (coronal) composite curved-slab MIP 1010 shows an aorta, common and external iliac arteries, renal arteries, and branches of celiac trunk. A sagittal view 1020 shows only aorta, celiac trunk, superior mesenteric artery, and left common iliac artery and its branches. Another sagittal view 1030 shows right common iliac artery and its branches. Aortic bifurcation is shown by arrows 1040 where the origin of respective excluded common iliac artery is seen as a discontinuity in the aorta. Since the origin of right common iliac artery is anterior to that of left common iliac artery, discontinuity is seen anteriorly in view 1020 and posteriorly in view 1030. The context-intensity, background intensity and vessel-intensity as discussed supra is shown in views 1010, 1020 and 1030.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, in one variation multiple start and endpoints could be selected in case multiple vessels need to be processed. In another variation the method could also determine centerlines of the vessel(s) of interest, which could be used as seed points (See e.g. Paik et al. (1998) in a paper entitled "*Automated flight path planning for virtual endoscopy*" and published in Med. Phys. 25:629–637). The centerline could undergo an iterative medialization and smoothing process that corrects the initial path and the user-selected points to produce a median centerline. From the centerline, a list of centerline points could be obtained by sampling the median centerline at subvoxel intervals. At every point in this list, the thickness of the vessel in the view direction is determined as discussed supra. However, it is noted and preferred that the present method is not dependent on calculating a centerline for the selected vessel since the start and endpoints are only used to select the vessels to be imaged. Furthermore, centerline calculation is a computationally intensive process which one would like to avoid.

In yet another variation, multiple views could be obtained by varying the projection plane and therewith the viewing plane to calculate the boundary pairs (thicknesses) and intensities to define the curved slab MIP. As the viewing plane changes, the curved slab is automatically re-calculated to fit its thickness to that of the vessel(s) in the new view direction. The plurality of planes could be viewed in a sequence and perceived as a movie. The plurality of planes could be spaced at a certain angular degree, for example at 1 or a few degree(s).

All such variations and other variations are considered to be within the scope and spirit of the present invention as defined by the following claims and their legal equivalents.

What is claimed is:

1. A method for viewing a vessel in an image with a three-dimensional volume, comprising the steps of:
    (a) determining in the view plane of said image a plurality of boundary pairs defining said vessel, wherein said vessel has a minimum slab thickness of 4 voxels;
    (b) determining at least one vessel-intensity for each one of said boundary pairs; and
    (c) viewing and displaying in the projection plane of said image said plurality of boundary pairs and said associated vessel-intensities.

2. The method as set forth in claim 1, further comprising the step of determining and viewing at least one context-intensity in the area surrounding each one of said plurality of boundary pairs.

3. The method as set forth in claim 1, further comprising the step of fine-tuning said boundary pairs and said vessel-intensities.

4. The method as set forth in claim 1, further comprising the step of filtering said boundary pairs.

5. The method as set forth in claim 1, further comprising the step of estimating a boundary pair using neighboring boundary pairs.

6. The method as set forth in claim 1, further comprising the step of including a calcium region located near said boundary pairs in said determination of said boundary pairs.

7. The method as set forth in claim 1, further comprising the step of excluding a bone region located near said boundary pairs from said determination of said boundary pairs.

8. A method for viewing a structure of interest in an image with a three-dimensional volume, comprising the steps of:
    (a) selecting a start-point and an end-point encompassing said structure of interest in a plane of said image, wherein said structure has a minimum slab thickness of 4 voxels; and
    (b) for each of a plurality of pixels defined in said plane
        (i) projecting a line in the view direction of said plane,
        (ii) determining a boundary pair defining said structure of interest along said line,
        (iii) determining a first intensity for said structure of interest enclosed by said boundary pair,
        (iv) determining a second intensity for structures surrounded by said boundary pair,
        (v) re-determining said boundary pair using said first intensity and said second intensity,
        (vi) re-determining said first intensity for said re-determined boundary pair,
        (vii) assigning said re-determined first intensity and said re-determined boundary pair to said pixel associated with said line, and
        (viii) displaying results of said assigning.

9. The method as set forth in claim 8, further comprising the step of determining at least one context-intensity in the area surrounding said boundary pair.

10. The method as set forth in claim 8, further comprising the step of filtering said boundary pairs.

11. The method as set forth in claim 8, further comprising the step of estimating a boundary pair using neighboring boundary pairs.

12. The method as set forth in claim 8, further comprising the step of excluding one or more boundary pairs based on a threshold.

13. The method as set forth in claim 8, further comprising the step of estimating a boundary pair using neighboring boundary pairs.

14. The method as set forth in claim 8, further comprising the step of including a calcium region located near said boundary pair in said determination of said boundary pair.

15. The method as set forth in claim 8, further comprising the step of excluding a bone region located near said boundary pair from said determination of said boundary pair.

16. A method of generating a movie of a structure of interest, comprising the steps of:
  (a) defining a plurality of image projection planes;
  (b) for each one of said projection planes determining a plurality of boundary pairs defining said structure of interest in the view plane associated with said projection plane, wherein said structure of interest has a minimum slab thickness of 4 voxels;
  (c) determining at least one intensity for said structure of interest associated with each one of said boundary pairs;
  (d) defining said view of said structure of interest by said plurality of boundary pairs and said associated intensities determined in each of said plurality of projection planes;
  (e) sequencing through said plurality of projection planes; and
  (f) displaying results of said sequencing.

17. The method as set forth in claim 16, further comprising the step of determining and viewing at least one context-intensity in the area surrounding each one of said plurality of boundary pairs.

* * * * *